US012205812B2

(12) United States Patent
Dada

(10) Patent No.: US 12,205,812 B2
(45) Date of Patent: Jan. 21, 2025

(54) INTERFACE FOR ELECTROSPRAY IONIZATION (ESI) IN CAPILLARY ELECTROPHORESIS WITH MASS SPECTROMETRY

(71) Applicant: GMJ Technologies, Inc., Everett, WA (US)

(72) Inventor: Oluwatosin O. Dada, Everett, WA (US)

(73) Assignee: GMJ Technologies, Inc., Everett, WA (US)

( * ) Notice: Subject to any disclaimer, the term of this patent is extended or adjusted under 35 U.S.C. 154(b) by 395 days.

(21) Appl. No.: 17/853,447

(22) Filed: Jun. 29, 2022

(65) Prior Publication Data

US 2023/0005731 A1 Jan. 5, 2023

Related U.S. Application Data

(60) Provisional application No. 63/217,381, filed on Jul. 1, 2021.

(51) Int. Cl.
*H01J 49/16* (2006.01)

(52) U.S. Cl.
CPC .................................. *H01J 49/167* (2013.01)

(58) Field of Classification Search
CPC ....... H01J 49/167; H01J 49/165; H01J 49/168
See application file for complete search history.

(56) References Cited

U.S. PATENT DOCUMENTS

2021/0220289 A1* 7/2021 Coffman .............. A61K 9/1688

FOREIGN PATENT DOCUMENTS

JP 6018205 B2 * 11/2016 ............. B01D 15/10

OTHER PUBLICATIONS

Fang, et al., A Robust and Extendable sheath flow interface with minimal dead volume for coupling CE with ESI-MS, Talanta, vol. 180, Apr. 1, 2018, pp. 376-382 (Year: 2018).*
Flaherty, et al., Nicked-sleeve interface for two-dimensional capillary electrophoresis, Analyst, Issue 13, 2013 (Year: 2013).*
(Continued)

*Primary Examiner* — Robert H Kim
*Assistant Examiner* — Laura Eloise Tandy
(74) *Attorney, Agent, or Firm* — Rowan TELS LLC

(57) ABSTRACT

The disclosed solution comprises an injection subassembly that includes a nicked alignment tube, a spray needle, and a conducting liquid tube. The nicked alignment tube has a nick near one end. The spray needle is fused within the nicked end of the nicked alignment tube and the fused spray needle and nicked alignment tube are inserted into the conducting liquid tube, where the nicked alignment tube aligns the spray needle coaxially within the conducting liquid tube. The nick and the entry end of the spray needle are positioned within the conducting liquid tube and the exit end of the spray needle extends out of the conducting liquid tube. The nick allows a conducting liquid to flow from the conducting liquid tube to within the nicked alignment tube and the spray needle. Also disclosed are a unitary optical-ESI system equipped with the injection subassembly and a method for using the same.

20 Claims, 10 Drawing Sheets

(56) References Cited

OTHER PUBLICATIONS

Chetwynd, Current Application of Capillary Electrophoresis in Nanomaterial Characterisation and Its Potential to Characterise the Protein and Small Molecule Corona, Nanomaterials 2018, 8, 99; doi:10.3390/nano8020099 MDPI Journal/nanomaterials, pp. 1-29 Feb. 10, 2018.
Fang, Talanta Journals Elsevier, A robust and extendable sheath flow interface with minimal dead volume for coupling CE with ESI-MS, pp. 376-382, Dec. 14, 2017.
Ferre, Elsiver Journal of Chromatography A, Evaluation of a nanoflow interface based on the triple-tube coaxial sheath-flow sprayer for capillary electrophoresis-mass spectrometry coupling in metabolomics, pp. 1-8, Feb. 7, 2021.
Gonzalez-Ruiz, Evolution in the design of a low sheath-flow interface for CE-MS and application to biological samples, Electrophoresis 2018, 39, Oct. 21, 2017, pp. 853-861.
Gonzalez-Ruiz_Evaluation of a new low sheath-flow interface for CE-MS, 2016 Wiley-VCH Verlag GmbH & Co. KGaA, Weinheim Electrophoresis Journal, Electrophoresis 2016, 37 pp. 936-946.
Hirayama, Development of a sheathless CE-ESI-MS interface, Electrophoresis / vol. 39, Issue 11, https:// doi org.offcampus.lib.washington.edu/10.1002/elps.201800017, pp. 1-19, Mar. 1, 2018.
Hocker, Two capillary approach for a multifunctional nanoflow sheath liquid interface for capillary electrophoresis-mass spectrometry, 2020 The Authors. Electrophoresis published by Wiley-VCH GmbH Electrophoresis Journal Aug. 3, 2020, pp. 369-373.
Huang, Elsiver Journal of Chromatography A, The development of a sheathless capillary electrophoresis electrospray ionization-mass spectrometry interface based on thin conducting liquid film, pp. 131-137, Aug. 29, 2012.
Konasova, Talanta, Investigating the position of the separation capillary and emitter tube tips in a nanoflow sheath-liquid CE-ESI-MS interface to decouple the ESI potential, Feb. 12, 2021 pp. 1-10.
Krenkova, Self-aligning subatmospheric hybrid liquid junction electrospray interface for capillary electrophoresis, 2015 Wiley-VCH Verlag GmbH & Co. KGaA, Weinheim Electrophoresis Journal Electrophoresis 2016, 37, Aug. 18, 2015 pp. 414-417.
Kristoff, ACS Publication Anal. Chem. Jan. 23, 2020, 92, pp. 3006-3013.
Risley, Improved sensitivity by post-column chemical environment modification of CE-ESI-MS using a flow-through microvial interface, 2017 Wiley-VCH Verlag GmbH & Co. KGaA, Weinheim Electrophoresis Journal, pp. 1644-1648, Mar. 21, 2017.
Sauer, A robust sheath-flow CE-MS interface for hyphenation with Orbitrap MS, 2020 The Authors. Electrophoresis published by Wiley-VCH Verlag GmbH & Co. KGaA, Weinheim Electrophoresis Journal, Apr. 23, 2020, pp. 1280-1286.
Stolz, Recent advances in capillary electrophoresis-mass spectrometry: Instrumentation, methodology and applications, Brno, Czech Republic, 2018 Wiley-VCH Verlag GmbH & Co. KGaA, Weinheim, Sep. 7, 2018, pp. 79-112.
Tycova, Recent advances in CE-MS coupling: Instrumentation, methodology, and applications, Brno, Czech Republic, 2016 Wiley-VCH Verlag GmbH & Co. KGaA, Weinheim, Electrophoresis Journal, Aug. 30, 2016, pp. 115-134.
Wang, ACS Publications dx.doi.org/10.1021/ac302616m | Anal. Chem. 2012, Ultrasensitive Sample Quantitation via Selected Reaction Monitoring UsingCITP/CZE-ESI-Triple Quadrupole MS, pp. 10395-10403.

* cited by examiner

INTERFACE FOR ELECTROSPRAY IONIZATION (ESI) IN CAPILLARY ELECTROPHORESIS WITH MASS SPECTROMETRY

CROSS-REFERENCE TO RELATED APPLICATIONS

This application claims the benefit of U.S. provisional patent application Ser. No. 63/217,381, filed on Jul. 1, 2021, the contents of which are incorporated herein by reference in their entirety.

BACKGROUND

Advancements in ionization interfaces for coupling capillary electrophoresis (CE) with electrospray ionization (ESI) mass spectrometry (MS) have enabled applications of CE-ESI-MS for various chemical and biochemical analyses. Existing CE-ESI-MS uses electrospray interfaces that may be broadly categorized as either sheath flow (U.S. Pat. Nos. 5,993,633; 9,465,014; 9,234,880; and 8,613,845) or sheathless (U.S. Pat. Nos. 9,927,396; 8,754,370; 6,863,790; 10,121,645; and 5,505,832).

Sheath flow interfaces typically utilize a coaxial conducting liquid to provide electrical contact for the electrophoretic separation, modify the separation medium to be more MS-compatible, and generate electrospray for MS detection. The f sheath flow interface was developed by Smith's group and was commercialized in the 1990s (U.S. Pat. No. 5,993,633). Since then other versions of the sheath flow interface have been developed. Notably, Dovichi's group developed a sheath flow interface that uses electroosmotic nanoflow to drive the electrospray (U.S. Pat. Nos. 9,465,014 and 9,234,880). In that design, the spray emitter is a borosilicate glass pulled at the distal end to create a micro nozzle, typically with a 10 to 30 μm inner diameter. The separation capillary is inserted into the emitter filled with an MS-compatible conducting liquid supplied from the conducting liquid reservoir through a conducting liquid channel. The high ESI voltage driving the electroosmotic flow inside the emitter is delivered to the conducting liquid reservoir. While this configuration has been shown to provide good sensitivity for multiple analytes the design still has some problems. The emitter's inner diameter of 0.75 mm introduces a relatively high sheath liquid to sample dilution.

Another notable version of sheath flow interface was developed by Chen's group (U.S. Pat. No. 8,613,845). That design uses a stainless steel hollow needle with a beveled tip. The needle acts as an electrode for the CE outlet and the spray emitter for MS. Although the steel needle interface is more rugged than tapered glass interfaces, the design is typically, used with the electrospray voltage delivered directly, which often leads to bubble formation and corona discharge due to redox reaction on the metal surface. This usually limits the electrospray performance. Further, metal emitters need a mechanical pump-driven flow to maintain a stable electrospray. This requirement creates a higher flow rate than the electrokinetically pumped interface described above, which then limits its sensitivity owing to higher dilution of the analyte by the conducting liquid.

In sheathless interface designs, the separation capillary commonly serves as the emitter which eliminates sample dilution associated with sheath flow interfaces. A notable design was developed by Moini's group (U.S. Pat. No. 6,863,790) and was recently commercialized. The interface used a porous capillary to provide electrical contact to the separation buffer without the introduction of a conducting liquid. The distal end of the separation capillary is etched to a thin porous thickness, sufficiently thin to be conductive. It is placed within a metal sleeve needle filled with a conductive liquid. ESI voltage is then applied to the metal needle to drive electrospray at the capillary tip. Though the interface provides better sensitivity over sheath flow interfaces, the etched capillary is extremely fragile. Under high voltage, deterioration of the porous tip leads to degraded electrospray and decreased sensitivity. Another major drawback is insufficient flow to drive electrospray when performing separation with negligible or reversed electro-osmotic flow. The electrophoresis buffer is also the electrospray liquid, which limits the allowable separation conditions.

Due to the electrospray ionization efficiency dependence of MS detection, quantitation in CE-ESI-MS may benefit from coupling optical detection with the electrospray interface. A few attempts have been made so far to achieve this with marginal success. However, integrating optical detection with ESI in CE-ESI-MS is still a challenge due to the complexity of integrating relatively large optical components with an electrospray interface.

In existing sheath flow ESI interfaces, the use of a conducting liquid offers flexibility in separation buffer composition. In contrast, a sheathless interface may use the separation buffer without the introduction of a conducting liquid to generate electrospray. A sheathless interface has the benefit of high sensitivity due to the absence of sheath flow dilution.

An important requirement for a CE-ESI-MS interface is the stability of the electrospray. Achieving stable electrospray at a nanoliter-per-minute flow rate is a challenge with existing technologies. There is, therefore, a need for a CE-ESI-MS interface with improved electrospray stability. There is further a need for such a solution to incorporate optical detection capabilities to incorporate the benefits of such additional testing capabilities.

BRIEF SUMMARY

The disclosed solution comprises an injection subassembly that includes a nicked alignment tube, a spray needle, and a conducting liquid tube. The nicked alignment tube has a nick near one end. The spray needle is fused within the nicked end of the nicked alignment tube with an entry end of the spray needle positioned alongside the nick and an exit end of the spray needle extending out of the nicked end. The fused spray needle and nicked alignment tube are inserted into the conducting liquid tube, where the nicked alignment tube aligns the spray needle coaxially within the conducting liquid tube. The nick and the entry end of the spray needle are positioned within the conducting liquid tube and the exit end of the spray needle extends out of the conducting liquid tube. The spray needle may be a sheath flow spray needle or a sheathless spray needle. The nicked alignment tube and the conducting liquid tube fit is fluid-tight. The nick allows a conducting liquid to flow from the conducting liquid tube to within the nicked alignment tube and the spray needle.

The disclosed solution further comprises an ESI system that includes the injection subassembly disclosed above. The ESI system also includes a junction fitting with at least a first port, a second port, and a third port coaxial with the first port. The injection subassembly is connected to the third port and the conducting liquid tube and the third port fit is fluid-tight. The ESI system also includes a capillary which may be a sheath flow capillary and a sheathless capillary. The capillary runs through the first port and the third port of the junction fitting into the injection subassembly, where the nicked alignment tube aligns the capillary coaxially within the conducting liquid tube. The capillary and the nicked alignment tube fit is fluid-tight, and the capillary and the first port fit is fluid-tight. If the capillary is a sheath flow capillary, a narrow end of the sheath flow capillary extends into the sheath flow spray needle from the entry end to the exit end such that the conducting liquid and an analyte species flowing in the sheath flow capillary are mixed at the exit end of the sheath flow spray needle. If the capillary is a sheathless capillary, an adjustable gap is configured between the sheathless capillary and the entry end of the sheathless spray needle such that the conducting liquid and the analyte species within the sheathless capillary are mixed at the entry end of the sheathless spray needle. The ESI system also includes a conducting liquid reservoir holding the conducting liquid and configured with a conducting liquid channel. The conducting liquid channel is connected to the second port of the junction fitting and the conducting liquid channel, and the second port fit is fluid-tight. The ESI system further includes a high voltage source configured to electrically charge the conducting liquid within the conducting liquid reservoir. In one aspect, the ESI system further includes an optical manifold. The optical manifold includes at least one light source, at least one input-output optical port, and at least one light detector. The capillary extends from the first port of the junction fitting through the optical manifold. The ESI system and optical manifold together form a unitary optical-ESI system.

Finally, the disclosed solution includes a method for using the ESI system and unitary optical-ESI system equipped with the injection subassembly. Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Disclosed is a unitary optical-ESI system that generates electrospray with a spray-needle-fused, nicked alignment tube embedded in a conducting liquid tube to form an injection subassembly that may allow users to choose between sheath flow or sheathless ESI configurations based on what is most suitable for a specific application. Conventional ESI interfaces for use in CE-ESI-MS may be expensive, and conventional interface designs do not permit both sheath flow and sheathless ESI configurations.

In one embodiment, the disclosed solution integrates inline optical detection with ESI to enable orthogonal detection such as ultraviolet detection, infrared detection, laser-induced fluorescence detection, thermo-optical detection, scattering, and Raman detection, simultaneously with MS detection in nanoflow liquid separations.

Figure 1:
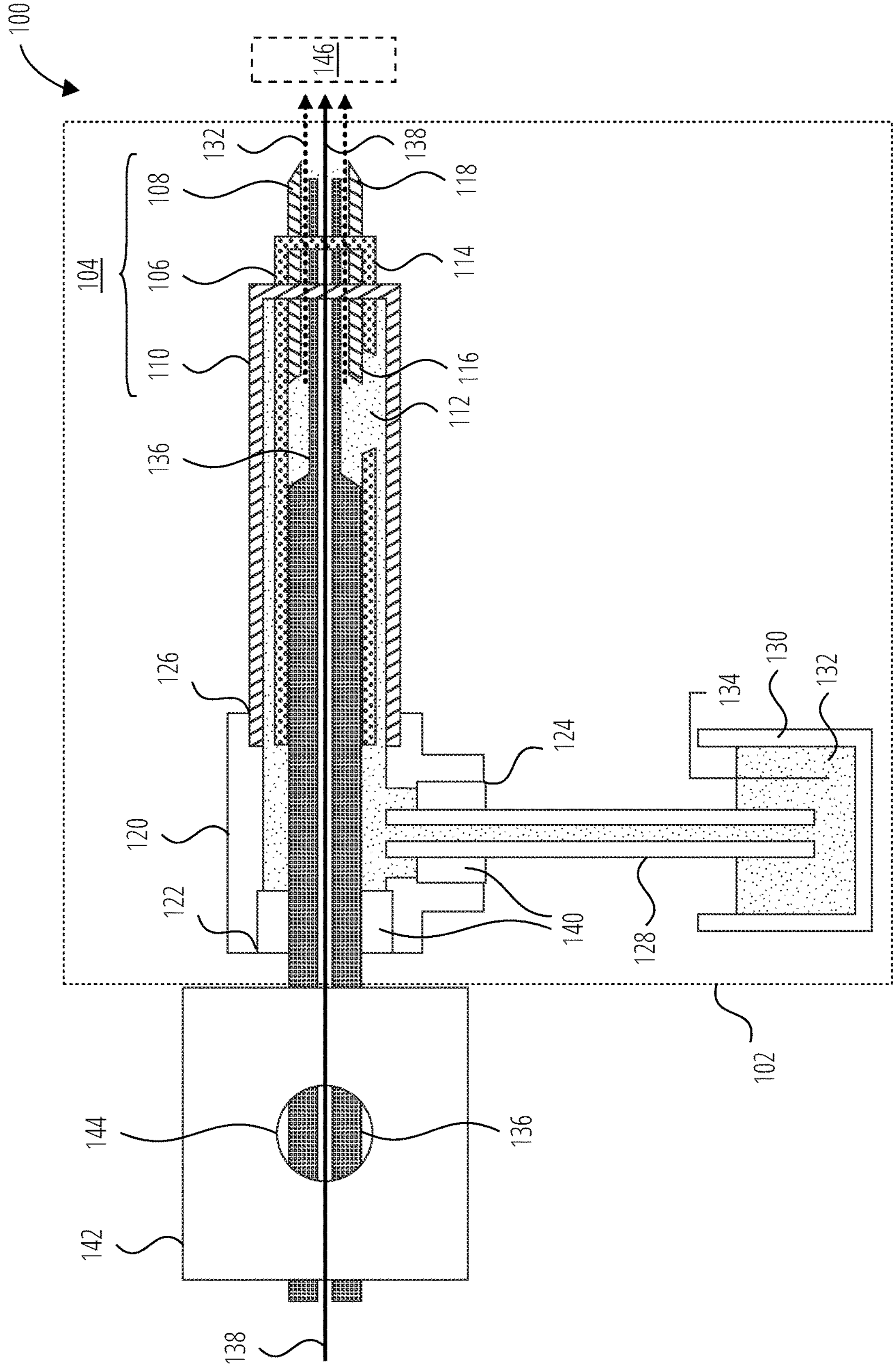
FIG. 1 illustrates a unitary optical-ESI system 100 in accordance with one embodiment.

FIG. 1 illustrates a unitary optical-ESI system 100 in accordance with one embodiment. The unitary optical-ESI system 100 may comprise an ESI system 102 that includes an injection subassembly 104. The injection subassembly 104 may include a nicked alignment tube 106, a spray needle 108, and a conducting liquid tube 110. The nicked alignment tube 106 may have a nick 112 at a nicked end 114. The spray needle 108 may have an entry end 116 and an exit end 118. The ESI system 102 may also include a junction fitting 120 having a first port 122, a second port 124, and a third port 126. A conducting liquid channel 128 may connect a conducting liquid reservoir 130 containing a conducting liquid 132 to the junction fitting 120. A high voltage source 134 may be configured to electrically charge the conducting liquid 132 in the conducting liquid reservoir 130.

The unitary optical-ESI system 100 may also include a capillary 136 configured to contain an analyte species 138. The capillary 136 may be a sheath flow capillary or a sheathless capillary. The ESI system 102 may include flow restriction valves 140 preventing flow of the conducting liquid 132 out of the first port 122 and the second port 124.

In addition to the ESI system 102, the unitary optical-ESI system 100 may further include an optical manifold 142. The optical manifold 142 may include at least one input-output optical port 144, one of which is shown here. The optical manifold 142 may further comprise the light source 202 and light detector 204 illustrated in FIG. 2. The output of the spray needle 108 may be injected into a mass spectrometer 146 or other equipment configured to take in and analyze an ESI species.

The injection subassembly 104 may comprise a nicked alignment tube 106 having a nick 112 near one end. The nicked alignment tube may be manufactured from at least one of polymer, metal, plastic, and ceramics. The nick may be created by at least one of micro dicing, laser cut, and mechanical excision of materials from the nicked alignment tube.

A spray needle 108 may be fused within the nicked end 114 of the nicked alignment tube 106. An entry end 116 of the spray needle 108 may be positioned alongside the nick 112 and an exit end 118 of the spray needle 108 may extend out of the nicked end 114. The spray needle may be manufactured from at least one of polymer, glass, metal, and ceramics. The tapered end of the spray needle may be formed by thermal pulling or grinding.

The fused nicked alignment tube 106 and spray needle 108 may be inserted into the conducting liquid tube 110. The conducting liquid tube may be manufactured from polymer using an extrusion tubing process.

The nicked alignment tube 106 may align the spray needle 108 coaxially within the conducting liquid tube 110. The nick 112 and the entry end 116 of the spray needle 108 may be positioned within the conducting liquid tube 110 while the exit end 118 of the spray needle 108 may extend out of the conducting liquid tube 110. The nicked alignment tube

106 may fit into the conducting liquid tube 110 such that their fit is fluid-tight. The nick 112 of the nicked alignment tube 106 allows a conducting liquid 132 to flow from the conducting liquid tube 110 to within the nicked alignment tube 106 and the spray needle 108, as shown.

The ESI system 102 of the unitary optical-ESI system 100 may further include a junction fitting 120 having at least a first port 122, a second port 124, and a third port 126 coaxial with the first port 122. The junction fitting 120 may in one embodiment be a polyether ether ketone (PEEK) tee fitting. The injection subassembly 104 may be connected to the third port 126 as illustrated. The conducting liquid tube 110 and the third port 126 may fit together in a fluid-tight manner.

A capillary 136, either a sheath flow capillary or a sheathless capillary, may be inserted through the first port 122 and the third port 126 of the junction fitting 120 and into the injection subassembly 104. The nicked alignment tube 106 may align the capillary 136 coaxially within the conducting liquid tube 110. The fit between the capillary 136 and the nicked alignment tube 106 may be fluid-tight. The capillary 136 and the first port 122 fit may also be fluid-tight.

The ESI system 102 of the unitary optical-ESI system 100 may include a conducting liquid reservoir 130 holding the conducting liquid 132 and configured with a conducting liquid channel 128. The conducting liquid channel 128 may be connected to the second port 124 of the junction fitting 120. The fit between the conducting liquid channel 128 and the second port 124 may be fluid-tight A high voltage source 134 may be configured to electrically charge the conducting liquid 132 within the conducting liquid reservoir 130 when it is activated. The voltage provided by the high voltage source 134 may be of positive or negative polarity. In one embodiment, a voltage of 2 kV may be used. The charge differential induced across the conducting liquid 132 by the activation of the high voltage source 134 may cause the conducting liquid 132 to flow from the conducting liquid reservoir 130 through the conducting liquid channel 128 to the junction fitting 120 and into the conducting liquid tube 110. This may further induce movement and separation of the components of the analyte species 138 within the capillary 136 through the polarized or ionized nature of its constituents, including, in some embodiments, a separation buffer contained therein. For example, the separation buffer and/or the conductive liquid may be an organic-aqueous mixture containing acetic acid or formic acid.

The ESI system 102 may further include one or more flow restriction valves 140. These flow restriction valves 140 may be used to create the fluid-tight fits between the first port 122 and the capillary 136, as well as between the second port 124 and the conducting liquid channel 128. These flow restriction valves may be compression fittings, plugs, or ferrules manufactured from polymers, rubber, or adhesives.

The capillary 136 may extend from the first port 122 through an optical manifold 142 as illustrated. The ESI system 102 and the optical manifold 142 and its components, as illustrated in and described with respect to FIG. 2, may together form a unitary optical-ESI system 100, as disclosed herein.

Figure 2:
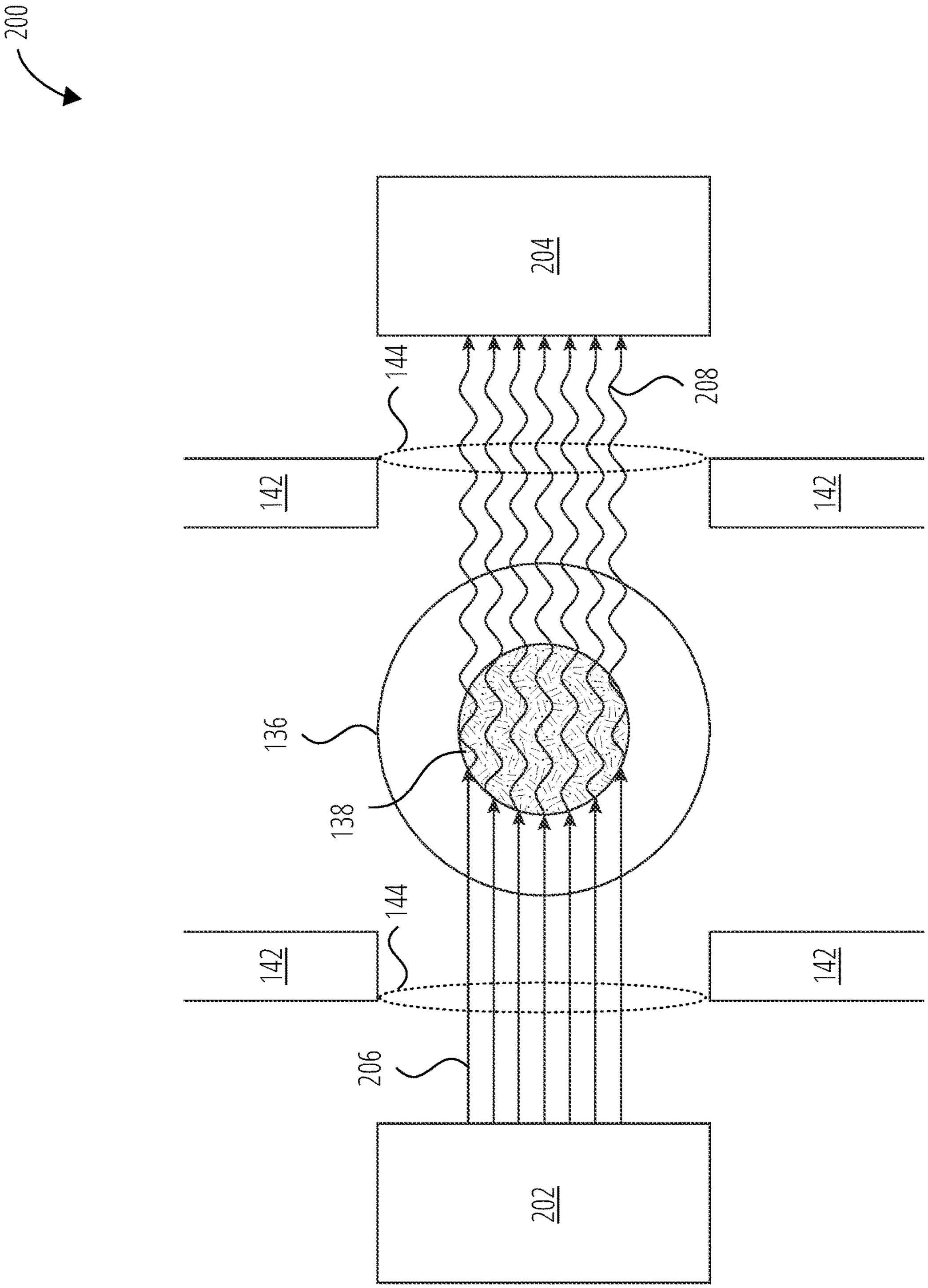
FIG. 2 illustrates an optical manifold configuration 200 in accordance with one embodiment.

FIG. 2 illustrates an optical manifold configuration 200 in accordance with one embodiment, such as may be implemented using the optical manifold 142 introduced with respect to FIG. 1. The optical manifold configuration 200 may comprise an optical manifold 142, at least one input-output optical port 144, at least one light source 202, and at least one light detector 204.

A capillary 136 containing an analyte species 138, as described with respect to FIG. 1, may be positioned within the optical manifold 142 such that light 206 from the light source 202 may be transmitted through an input-output optical port 144 and projected upon the analyte species 138 within the capillary 136. The light 206 may be transmitted through the analyte species 138, and may be transformed in some manner by the inherent characteristics of the analyte species 138. The resulting transformed output light 208 may be collected through an input-output optical port 144 and may be detected and analyzed by the light detector 204. The optical manifold 142 may contain multiple light sources 202 and light detectors 204, allowing a unitary optical-ESI system 100 such as described in FIG. 1 to perform various types of optical detection and analysis.

The light sources 202 of the optical manifold 142 may be configured to produce light 206 having a wavelength on the electromagnetic spectrum suitable for use in at least one of ultraviolet detection, infrared detection, laser-induced fluorescence (LIF) detection, thermo-optical detection, scattering, and Raman detection. The light detectors 204 may be devices suitable to detect these energies. In one embodiment, at least one of photodiode array (PDA), charge-couple device (CCD), or a photon counting device may be used as a light detector 204. A gradient-index (GRIN) rod may be used to transmit the transformed light to the detector 204.

Figure 3:
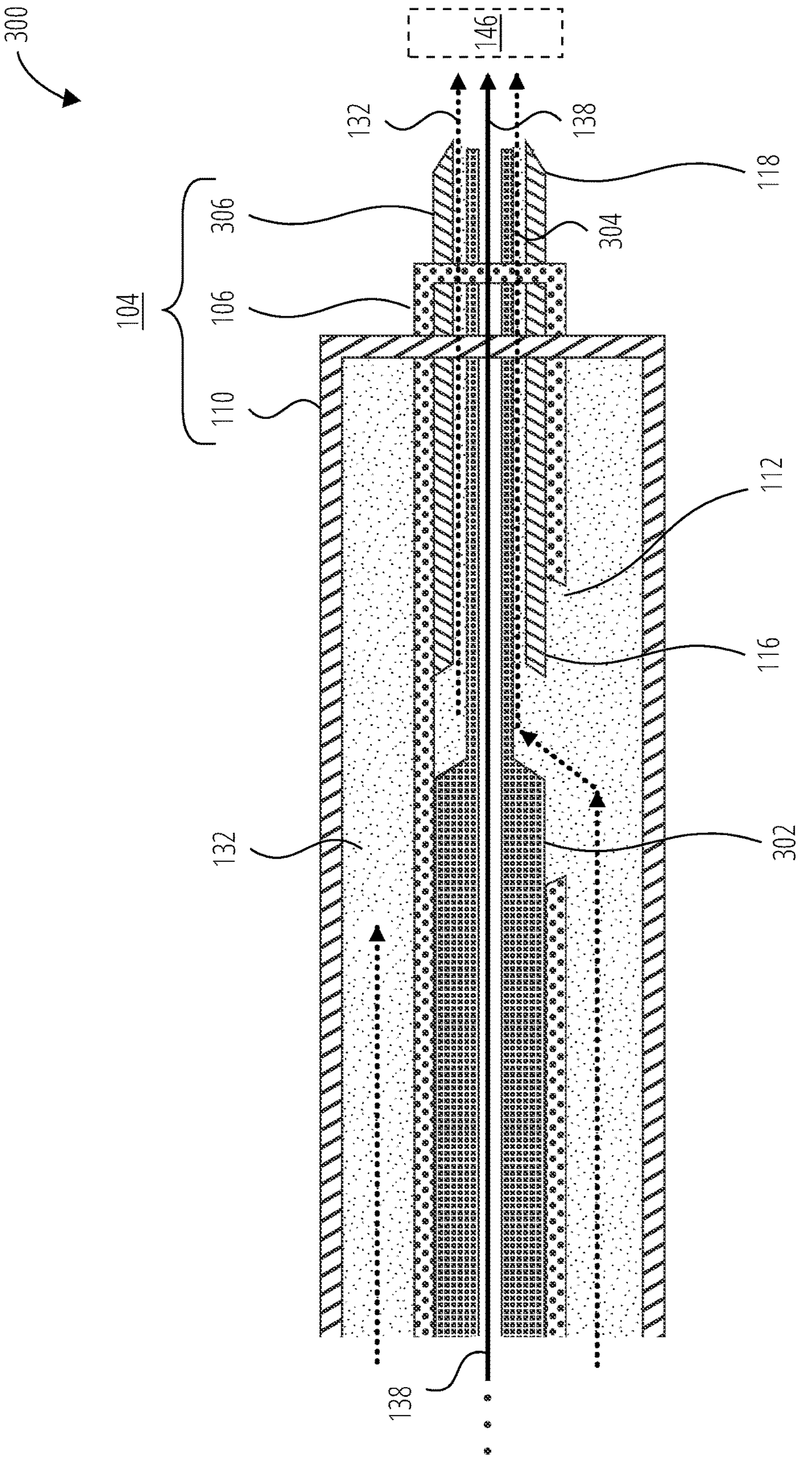
FIG. 3 illustrates a sheath flow ESI configuration 300 in accordance with one embodiment.

FIG. 3 illustrates a sheath flow ESI configuration 300 in accordance with one embodiment. The sheath flow ESI configuration 300 may comprise an injection subassembly 104 such as previously described, configured with a sheath flow spray needle 306, and a sheath flow capillary 302 having a narrow end 304 and containing an analyte species 138.

The narrow end 304 of the sheath flow capillary 302 may extend into the sheath flow spray needle 306, from its entry end 116 to its exit end 118. The nick 112 may allow the conducting liquid 132 to enter the nicked alignment tube 106 and the sheath flow spray needle 306, but because of the extension of the narrow end 304 into the sheath flow spray needle 306, the conducting liquid 132 may be prevented from mixing with the analyte species 138 before both substances are ejected as nanospray at the exit end 118 of the sheath flow spray needle 306 for analysis by a mass spectrometer 146 or similar equipment.

Figure 4:
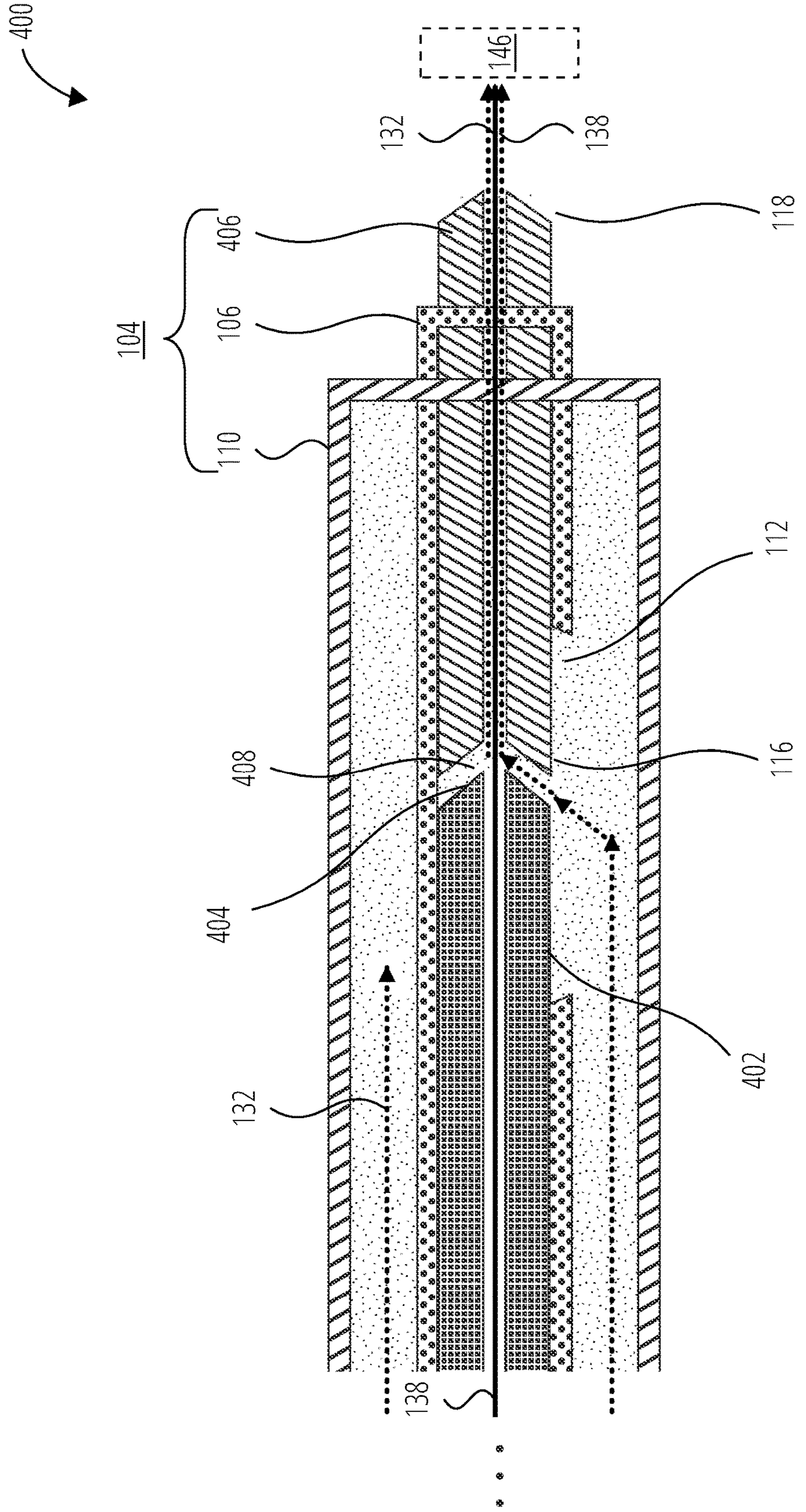
FIG. 4 illustrates a sheathless ESI configuration 400 in accordance with one embodiment.

FIG. 4 illustrates a sheathless ESI configuration 400 in accordance with one embodiment. The sheathless ESI configuration 400 may comprise an injection subassembly 104 such as previously described, configured with a sheathless spray needle 406, and a sheathless capillary 402 having a meniscal tapered end 404 and containing an analyte species 138.

In a sheathless ESI configuration 400, the sheathless capillary 402 may not include a narrow end 304 meant to extend into the sheath flow spray needle 306 as shown in FIG. 3. Rather, the sheathless capillary 402 may have a meniscal tapered end 404. the inner diameter of the sheathless spray needle 406 may be equivalent to the inner diameter of the sheathless capillary 402. As illustrated, the insertion of the meniscal tapered end 404 of the sheathless capillary 402 into the injection subassembly 104 may leave an adjustable gap 408 between the meniscal tapered end 404 and the entry end 116 of the sheathless spray needle 406.

Through this adjustable gap 408, the conducting liquid 132 may be in contact with the analyte species 138 within the sheathless capillary 402 as the analyte species 138 transits the gap between the meniscal tapered end 404 of the sheathless capillary 402 and the entry end 116 of the sheathless spray needle 406, and this mixture may be ejected as nanospray at the exit end 118 of the sheathless spray needle 406. In one embodiment, the adjustable gap 408 may be variable, such that setting it to a certain dimension permits a specific amount of conducting liquid 132 to be in contact with the analyte species 138. In this manner, the percentage of the conducting liquid 132 in the resulting nanospray may be selectably varied.

In some embodiments, the meniscal tapered end 404 may be configured to immediately abut the entry end 116 of the sheathless spray needle 406 with a fluid-tight fit when pressed far enough into the injection subassembly 104. In these embodiments, the adjustable gap 408 may be completely closed, such that no conducting liquid 132 is mixed with the analyte species 138. Thus the analyte species 138 alone, unmixed with conducting liquid 132 may be propelled as nanospray from the sheathless spray needle 406.

In this manner the disclosed unitary optical-ESI system 100 may take advantage of the flexibility of the injection subassembly 104 to perform a wider variety of optical, CE-ESI-MS, and similar testing without needing to purchase and house multiple largely redundant versions of expensive test equipment.

Figure 5:
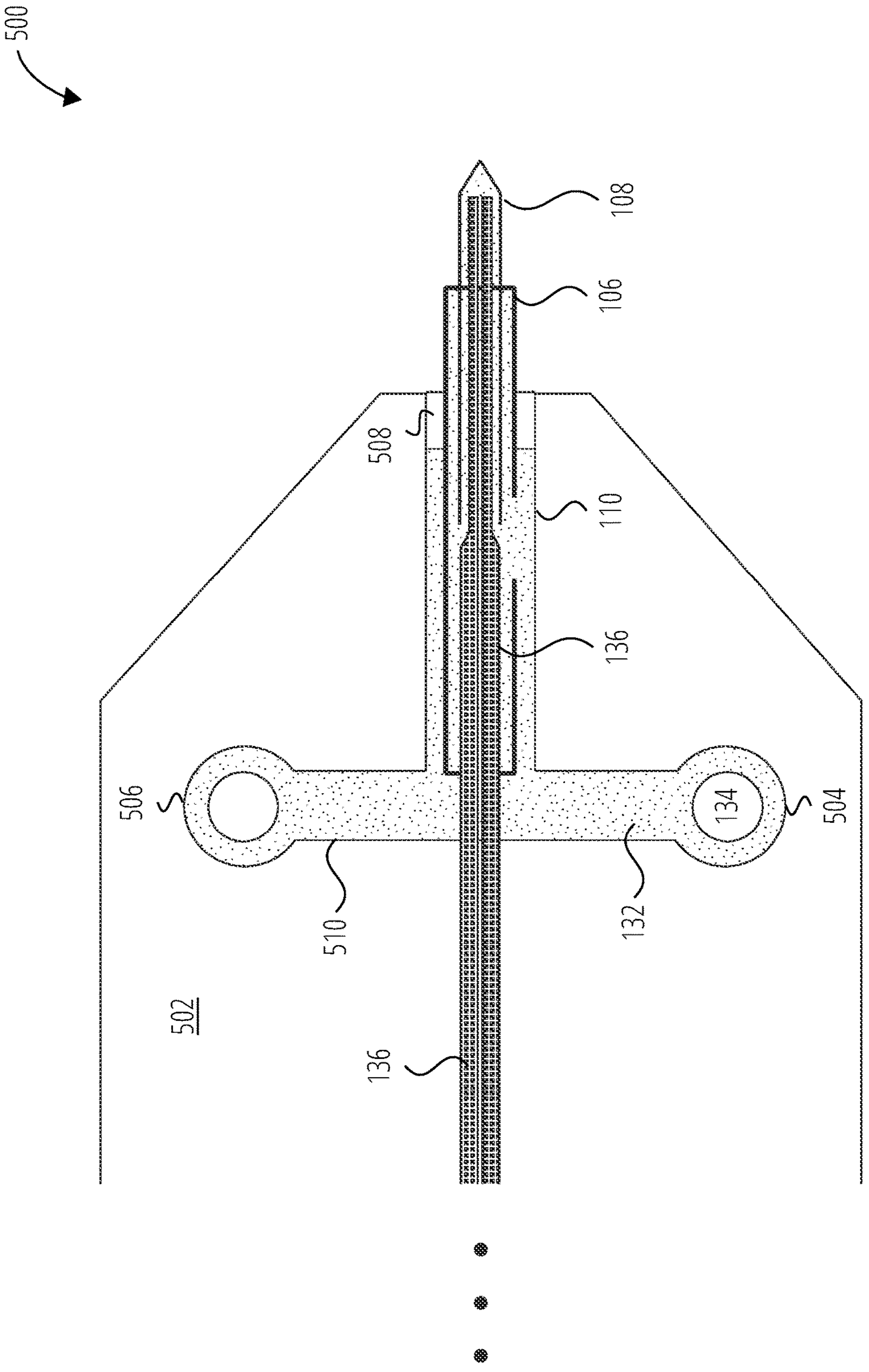
FIG. 5 illustrates a flat substrate injection subassembly 500 in accordance with one embodiment.

FIG. 5 illustrates a flat substrate injection subassembly 500 in accordance with one embodiment. The flat substrate injection subassembly 500 may comprise a flat substrate 502 that is configured with a conducting liquid tube 110 having an integrated conducting liquid channel 510 as part of the material of the flat substrate 502. The integrated conducting liquid channel 510 may include a conducting liquid inlet 504 and a conducting liquid outlet 506. The flat substrate injection subassembly 500 may also comprise a nicked alignment tube 106 and a spray needle 108 configured within the conducting liquid tube 110 similarly to what has been previously disclosed. In the flat substrate injection subassembly 500, a fluid-tight fit 508 between the conducting liquid tube 110 integral to the flat substrate 502 and the nicked alignment tube 106 may be formed through use of a valve, a gasket, or other sealing device, as will be immediately apprehended by one of ordinary skill in the art.

The flat substrate 502 may be manufactured from polymer, glass, plastic, ceramic, or similarly rigid materials, as are appropriate for the application in which it is utilized. The flat substrate 502 may be configured to support a capillary 136 carrying an analyte species 138 as shown. While the configuration illustrated is a sheath flow ESI configuration similar to that shown in FIG. 3, one of ordinary skill in the art will readily apprehend how the flat substrate injection subassembly 500 may equally accommodate a sheathless ESI configuration similar to that illustrated in FIG. 4. A high voltage source 134 may be electrically connected to the conducting liquid 132, and may induce a charge causing the conducting liquid 132 to flow and induce flow in the analyte species 138, as has been previously described, and is well understood in the art.

The flat substrate injection subassembly 500 may support miniaturization of the ESI system 102 previously described. In this manner, the flat substrate injection subassembly 500 may provide a small form-factor test sample collection device that may be used in mobile testing apparatus comparable in size to a mobile telephone or small tablet computer.

Figure 6:
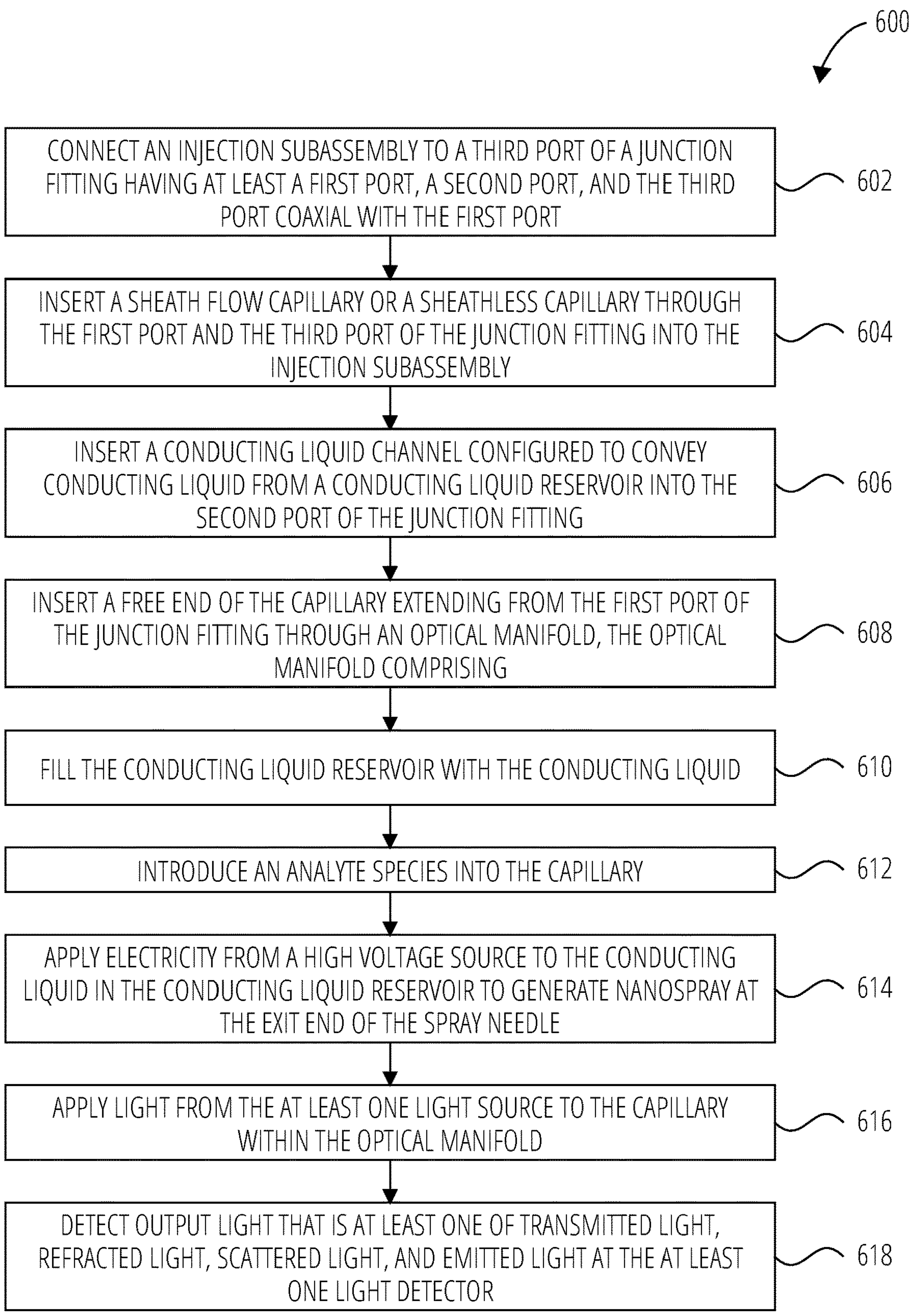
FIG. 6 illustrates a routine 600 in accordance with one embodiment.

FIG. 6 illustrates a routine 600 in one embodiment for using a unitary optical-ESI system such as that introduced with respect to FIG. 1. The routine 600 may begin at block 602, by connecting an injection subassembly to a third port of a junction fitting having at least a first port, a second port, and a third port that is coaxial with the first port. The injection subassembly may be the injection subassembly 104 previously described. The fit between the injection subassembly and the third port may be fluid-tight.

In block 604, a capillary may be inserted through the first port and the third port of the junction fitting and into the injection subassembly. The nicked alignment tube may align the capillary coaxially within the conducting liquid tube. The fits between the capillary and the first port of the junction fitting and the capillary and the nicked alignment tube may be fluid tight. The capillary may be either a sheath flow capillary or a sheathless capillary.

In block 606, a conducting liquid channel may be inserted into the second port of the junction fitting. The conducting liquid channel may be configured to convey conducting liquid from a conducting liquid reservoir. The conducting liquid channel and the second port fit may be fluid-tight.

In block 608, the free end of the capillary extending from the first port of the junction fitting may be inserted through an optical manifold, such as was introduced in FIG. 1 and FIG. 2 above. In block 610, the conducting liquid reservoir may be filled with the conducting liquid, and in block 612, an analyte species may be introduced into the capillary.

In block 614, an electric field from a high voltage source may be applied to the conducting liquid in the conducting liquid reservoir and to the inlet of the capillary. The application of this voltage may induce a charge differential in the conducting liquid, causing it to flow and to potentially propel the analyte species through the injection subassembly, to generate a nanospray at the exit end of the spray needle. This nanospray may be injected into analysis equipment such as mass spectrometers and similar devices.

In block 616, routine 600 light from at least one light source may be applied to the capillary within the optical manifold as described with respect to FIG. 2. In block 618, output light nay be detected by at least one light detector. The output light may be at least one of transmitted light, refracted light, scattered light, and emitted light at the at least one light detector. Other technical features may be readily apparent to one skilled in the art from the following figures, descriptions, and claims.

Figure 7A:
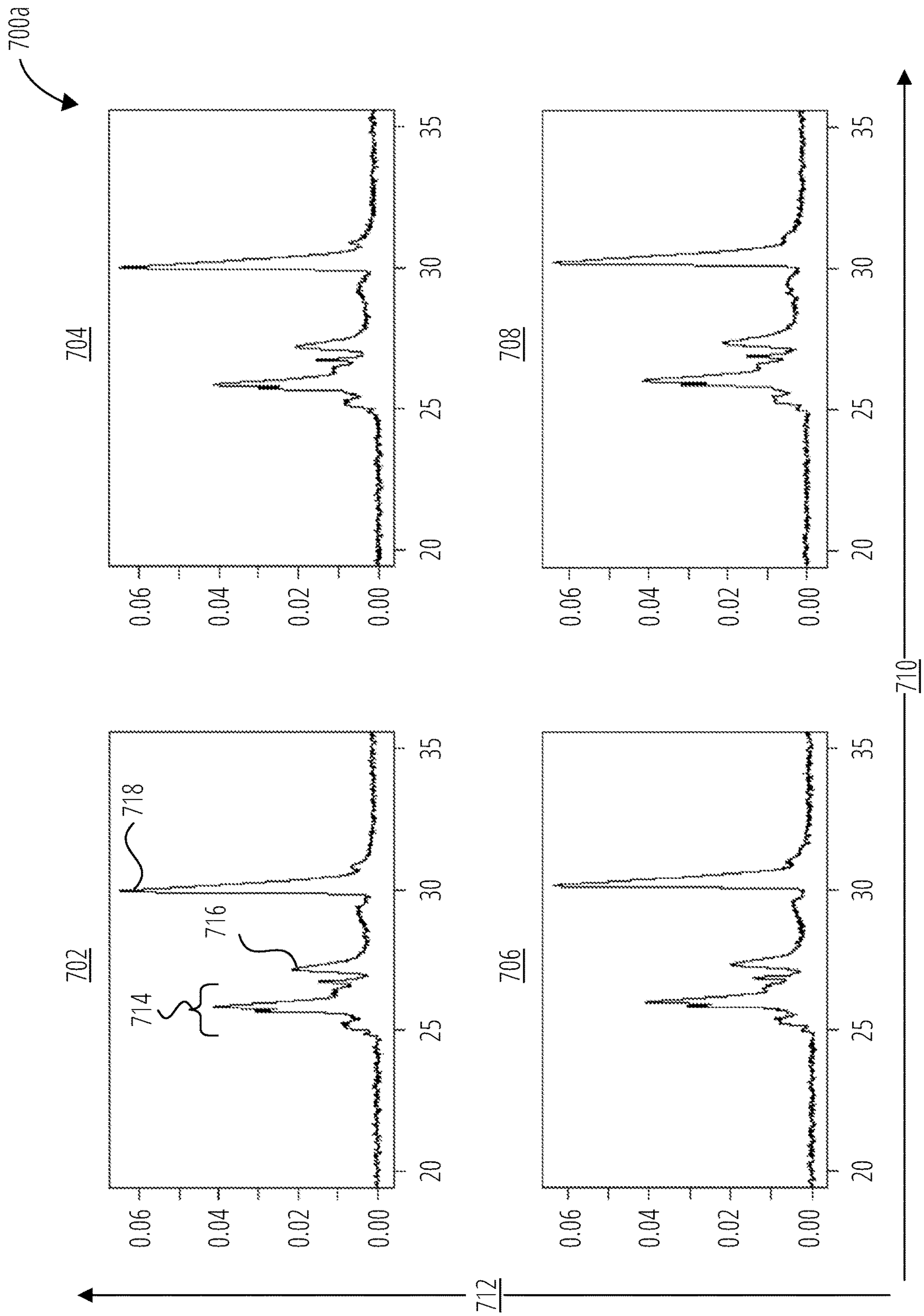
FIG. 7A and FIG. 7B illustrate UV electropherogram results 700*a* and MS total ion electropherogram results 700*b*, respectively, in accordance with one embodiment.
Figure 7B:
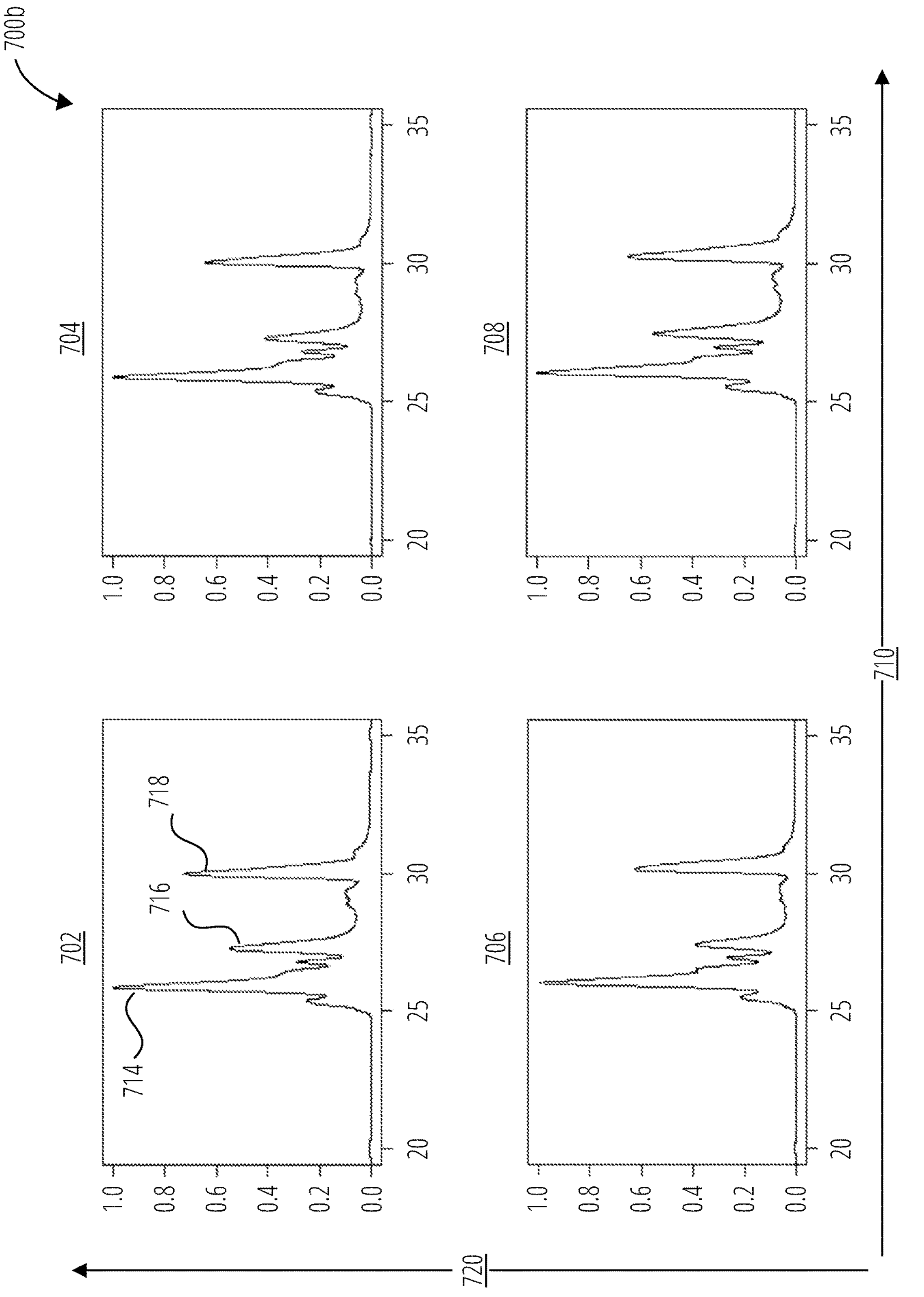

FIG. 7A and FIG. 7B illustrate UV electropherogram results 700*a* and MS total ion electropherogram results 700*b*, respectively, for a unitary optical-ESI system using an injection subassembly as disclosed herein, in accordance with one embodiment. These results were achieved under experimental conditions described below, across four testing replications: replication 702, replication 704, replication 706, and replication 708.

The UV electropherogram results 700*a* for replications 702-708 are displayed with the x-axis measuring migration time 710 in minutes, and the y-axis measuring UV absorbance 712. The MS total ion electropherogram results 700*b* for replications 702-708 are displayed with the x-axis measuring migration time 710 and the y-axis measuring relative intensity 720. In each electropherogram, for each replication, peaks may be seen corresponding to the lysozyme 714, bovine serum albumin 716, and myoglobin 718 in the analyte species introduced for analysis.

The UV electropherogram results 700*a* and MS total ion electropherogram results 700*b* were obtained during a proof-of-concept study to demonstrate the improvements represented by a unitary optical-ESI system configured with an injection subassembly as disclosed herein. The unitary optical-ESI system was a unitary optical-ESI system 100 such as was introduced in FIG. 1, and was configured to perform ultraviolet light and mass spectrometry detections.

Unless otherwise specified, below all reagents were purchased from Sigma Aldrich Co, St. Louis, Mo. Experiments were performed on a CeMAX UV™ (GMJ Technologies, Inc., Seattle Washington) equipped with a cartridge comprising a capillary and the optical-ESI interfaces disclosed herein. The capillary was a 50 mm i.d.×360 mm o.d.×100 cm long polyacrylamide coated silica capillary (GMJ Technologies, Inc., Seattle WA).

For all experiments, the separation buffer was 5% acetic acid, and the electrospray conductive liquid was 0.1% formic acid in 10% methanol. For each analysis, the separation capillary was conditioned with 0.1 M hydrochloric acid, followed by a water rinse, then the separation buffer. Each conditioning step was performed with 20 psi pressure for 5 minutes. For protein analysis, the sample was a mixture of standard proteins containing lysozyme 714, bovine serum albumin 716 (BSA), and myoglobin 718 diluted in distilled de-ionized water at 1 mg/mL concentration of each protein.

Samples were hydrodynamically injected at 5 psi for 5 seconds. In all experiments, the spray needle outlet was placed about 3 mm away from the mass spectrometer inlet. All experiments were performed with a Thermo Velos-Orbitrap mass spectrometer in positive mode using the following settings:

capillary voltage: 38 V,
capillary temperature: 275° C.,
tube lens: 200,
maximum injection: 350 ms, and
m/z range: 200 to 2000.

The CE separation voltage was +20 kV and the ESI voltage was set at +2.0 kV. UV detection was performed at 200 to 400 nm with 100 ms integration time.

As may be seen, both the UV electropherogram results 700*a* and MS total ion electropherogram results 700*b* for an ESI system using an injection subassembly disclosed herein show similar peak profiles, a base peak width of approximately 30 seconds, good sensitivity, and repeatability, as will be appreciated by one of ordinary skill in the art.

Figure 8:
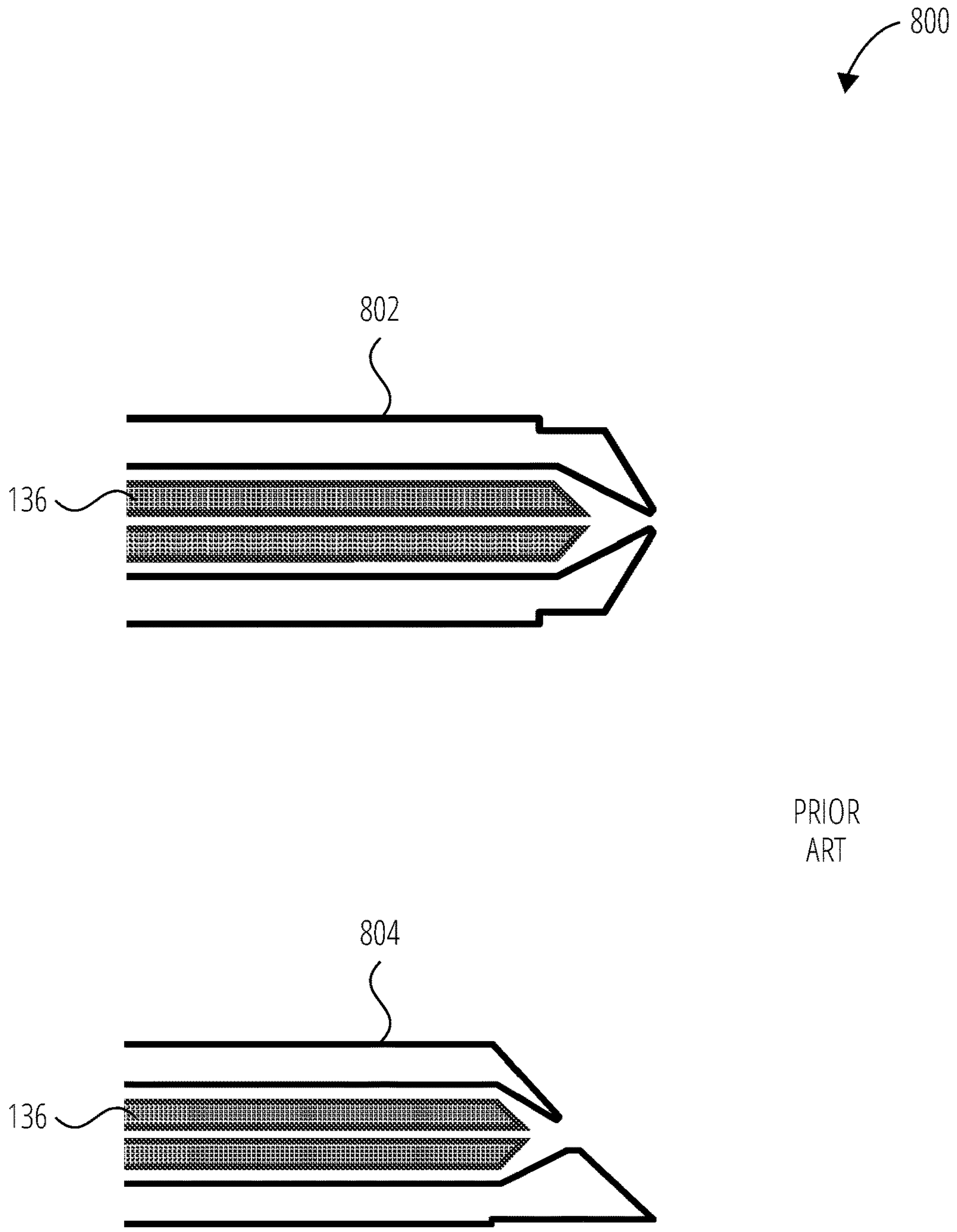
FIG. 8 illustrates conventional injection configurations 800.

FIG. 8 illustrates a conventional injection configurations 800 that uses a tapered conducting liquid tube 110, without the spray needle 108 and the nick alignment tube 106, to generate nanospray. These conventional injection configurations 800 include a configuration with a capillary 136 within a cone tip conducting liquid tube 802 and a capillary 136 within a chamfer tip conducting liquid tube 804, as illustrated. Configurations such as the conventional injection configurations 800 may be used in an ESI system, and may produce test results exhibiting spray stability profiles 900 as described with respect to FIG. 9.

Figure 9:
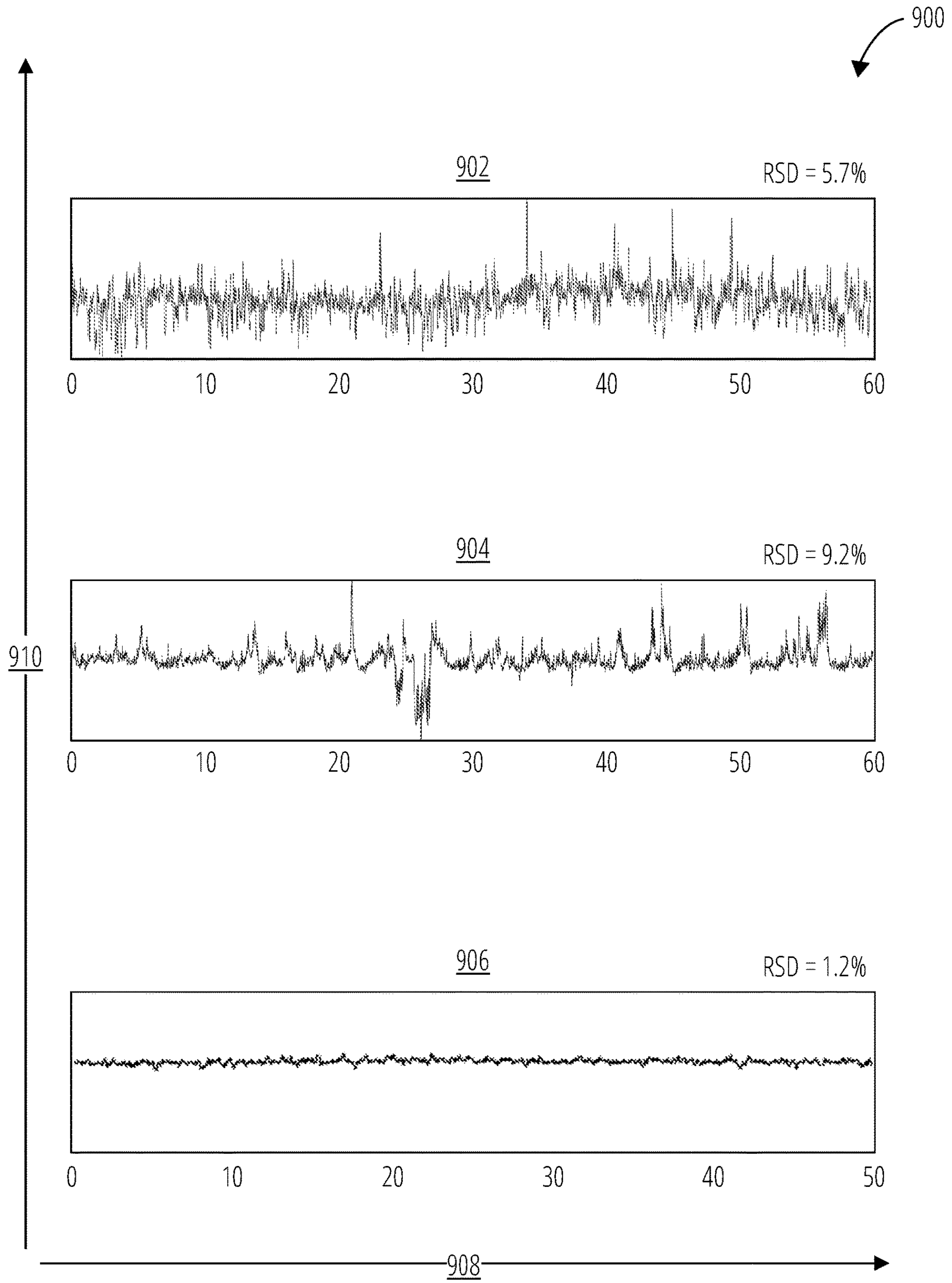
FIG. 9 illustrates spray stability profiles 900 in accordance with one embodiment.

FIG. 9 illustrates spray stability profiles 900 in accordance with one embodiment. The spray stability profiles 900 illustrated comprise a conventional cone tip configuration profile 902, a conventional chamfer tip configuration profile 904, and an injection subassembly configuration profile 906, created during tests run using an ESI system configured with a cone tip conducting liquid tube 802, a chamfer tip conducting liquid tube 804, and injection subassembly 104, respectively.

The x-axis of each graph measures migration time 908 in minutes. The y-axis shows the measured intensity 910 across the migration time 908 during testing according to the experimental conditions described with respect to FIG. 7A and FIG. 7B. The background electrolyte and the ESI conducting liquid were continuously infused while the CE and ESI voltage were on. The electrospray ion counts were monitored while the CE and the ESI voltage were continuously applied for 50 minutes or more.

One drawback to use of conventional configurations such as those illustrated in FIG. 8. is the challenge of achieving stable electrospray and minimizing the dead volume between the separation capillary and the emitter tip. As may be see in FIG. 9, the conventional cone tip configuration profile 902 may achieve a spray stability having a relative standard deviation (RSD) of 5.7% under the experimental conditions described above. A conventional chamfer tip configuration profile 904 may achieve a spray stability with an RSD of 9.2%.

In comparison, an ESI system such as the ESI system 102 illustrated in FIG. 1, equipped with an injection subassembly 104 as disclosed herein, may under these same conditions achieve a more stable spray than one using one of these conventional injection configurations 800. As may be seen in these results, the injection subassembly configuration profile 906 exhibits a spray stability having an RSD of 1.2%. As will be appreciated by one of ordinary skill in the art, the injection subassembly 104 disclosed herein thus represents a significant improvement over two conventional injection configurations 800.

LISTING OF DRAWING ELEMENTS

100 unitary optical-ESI system
102 ESI system
104 injection subassembly
106 nicked alignment tube
108 spray needle
110 conducting liquid tube
112 nick
114 nicked end
116 entry end
118 exit end
120 junction fitting
122 first port
124 second port
126 third port
128 conducting liquid channel
130 conducting liquid reservoir
132 conducting liquid
134 high voltage source
136 capillary
138 analyte species
140 flow restriction valve
142 optical manifold
144 input-output optical port
146 mass spectrometer
200 optical manifold configuration
202 light source
204 light detector
206 light
208 output light
300 sheath flow ESI configuration
302 sheath flow capillary
304 narrow end
306 sheath flow spray needle
400 sheathless ESI configuration
402 sheathless capillary
404 meniscal tapered end
406 sheathless spray needle
408 adjustable gap
500 flat substrate injection subassembly
502 flat substrate
504 conducting liquid inlet
506 conducting liquid outlet
508 fluid-tight fit

510 integrated conducting liquid channel
600 routine
602 block
604 block
606 block
608 block
610 block
612 block
614 block
616 block
618 block
700*a* UV electropherogram results
700*b* MS total ion electropherogram results
702 replication
704 replication
706 replication
708 replication
710 migration time
712 UV absorbance
714 lysozyme
716 bovine serum albumin
718 myoglobin
720 intensity
800 conventional injection configurations
802 cone tip conducting liquid tube
804 chamfer tip conducting liquid tube
900 spray stability profiles
902 conventional cone tip configuration profile
904 conventional chamfer tip configuration profile
906 injection subassembly configuration profile
908 migration time
910 intensity Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure may be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" may be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. An injection subassembly comprising:

a nicked alignment tube having a nick near one end;

a spray needle fused within the nicked end of the nicked alignment tube, wherein an entry end of the spray needle is positioned alongside the nick and an exit end of the spray needle extends out of the nicked end, wherein the spray needle is one of a sheath flow spray needle and a sheathless spray needle; and a conducting liquid tube, the nicked alignment tube and the spray needle inserted into the conducting liquid tube, wherein the nicked alignment tube aligns the spray needle coaxially within the conducting liquid tube, wherein the nick and the entry end of the spray needle are positioned within the conducting liquid tube and the exit end of the spray needle extends out of the conducting liquid tube, wherein the nicked alignment tube and the conducting liquid tube fit is fluid-tight, and wherein the nick allows a conducting liquid to flow from the conducting liquid tube to within the nicked alignment tube and the spray needle.

2. The injection subassembly apparatus of claim 1, wherein the nicked alignment tube is manufactured from at least one of polymer, metal, plastic, and ceramics, and wherein the nick is created by at least one of micro dicing, laser cut, and mechanical excision of materials from the nicked alignment tube.

3. The injection subassembly apparatus of claim 1, wherein the spray needle is manufactured from at least one of polymer, glass, metal, and ceramics, and is tapered using at least one of thermal pulling and grinding.

4. The injection subassembly apparatus of claim 1, wherein the conducting liquid tube is manufactured from polymer using an extrusion tubing process.

5. The injection subassembly apparatus of claim 1, wherein the conducting liquid tube is configured within a flat substrate, the conducting liquid tube further comprising an integrated conducting liquid channel including a conducting liquid inlet and a conducting liquid outlet, the flat substrate providing support for a capillary.

6. The injection subassembly apparatus of claim 5, wherein the flat substrate is manufactured from at least one of polymer, glass, plastic, and ceramics.

7. An electrospray ionization (ESI) system comprising:
- an injection subassembly comprising:
  - a nicked alignment tube having a nick near one end;
  - a spray needle fused within the nicked end of the nicked alignment tube,
    - wherein an entry end of the spray needle is positioned alongside the nick and an exit end of the spray needle extends out of the nicked end,
    - wherein the spray needle is one of a sheath flow spray needle and a sheathless spray needle; and
  - a conducting liquid tube, the nicked alignment tube and the spray needle inserted into the conducting liquid tube,
    - wherein the nicked alignment tube aligns the spray needle coaxially within the conducting liquid tube,
    - wherein the nick and the entry end of the spray needle are positioned within the conducting liquid tube and the exit end of the spray needle extends out of the conducting liquid tube,
    - wherein the nicked alignment tube and the conducting liquid tube fit is fluid-tight, and
    - wherein the nick allows a conducting liquid to flow from the conducting liquid tube to within the nicked alignment tube and the spray needle;
- a junction fitting comprising at least a first port, a second port, and a third port coaxial with the first port, wherein the injection subassembly is connected to the third port and wherein the conducting liquid tube and the third port fit is fluid-tight;
- a capillary comprising one of a sheath flow capillary and a sheathless capillary,
  - wherein the capillary is inserted through the first port and the third port of the junction fitting into the injection subassembly,
  - wherein the nicked alignment tube aligns the capillary coaxially within the conducting liquid tube,
  - wherein the capillary and the nicked alignment tube fit is fluid-tight, and
  - wherein the capillary and the first port fit is fluid-tight;
  - on condition the capillary is the sheath flow capillary:
    - a narrow end of the sheath flow capillary extends into the sheath flow spray needle from the entry end to the exit end such that the conducting liquid and an analyte species flowing in the sheath flow capillary are mixed at the exit end of the sheath flow spray needle; and
  - on condition the capillary is the sheathless capillary:
    - an adjustable gap is configured between a meniscal tapered end of the sheathless capillary and the entry end of the sheathless spray needle such that the conducting liquid and the analyte species within the sheathless capillary are mixed at the entry end of the sheathless spray needle;
- a conducting liquid reservoir holding the conducting liquid and configured with a conducting liquid channel, wherein the conducting liquid channel is connected to the second port of the junction fitting and the conducting liquid channel and the second port fit is fluid-tight; and
- a high voltage source configured to electrically charge the conducting liquid within the conducting liquid reservoir.

8. The ESI system of claim 7, wherein the nicked alignment tube is manufactured from at least one of polymer, metal, plastic, and ceramics, and wherein the nick is created by at least one of micro dicing, laser cut, and mechanical excision of materials from the nicked alignment tube.

9. The ESI system of claim 7, wherein the spray needle is manufactured from at least one of polymer, glass, metal, and ceramics, and is tapered using at least one of thermal pulling and grinding.

10. The ESI system of claim 7, wherein the conducting liquid tube is manufactured from polymer using an extrusion tubing process.

11. The ESI system of claim 7, wherein the junction fitting is a tee fitting manufactured from at least one of polyether ether ketone (PEEK) and related materials.

12. The ESI system of claim 7, further comprising at least one flow restriction valve, wherein at least one of the capillary and the first port fit and the conducting liquid channel and the second port fit is made fluid tight by the at least one flow restriction valve.

13. The ESI system of claim 7, wherein the adjustable gap between the meniscal tapered end of the sheathless capillary and the entry end of the sheathless spray needle is closed such that the analyte species and the conducting liquid are not mixed and the analyte species travels unmixed through the sheathless spray needle.

14. The ESI system of claim 7, further comprising:
- an optical manifold comprising:
  - at least one light source;
  - at least one input-output optical port; and
  - at least one light detector,
  - wherein the capillary extends from the first port of the junction fitting through the optical manifold, the ESI system and optical manifold together forming a unitary optical-ESI system.

15. The ESI system of claim 14, further comprising at least one gradient-index (GRIN) rod used to perform at least one of:
- applying light from the at least one light source to the capillary within the optical manifold; and
- transmitting output light to the at least one light detector.

16. The ESI system of claim 14, wherein the at least one light source emits light having a wavelength on the electromagnetic spectrum suitable for use in at least one of ultraviolet detection, infrared detection, laser-induced fluorescence detection, thermo-optical detection, scattering, and Raman detection.

17. A method of using an electrospray ionization (ESI) interface, comprising:
- connecting an injection subassembly to a third port of a junction fitting having at least a first port, a second port, and the third port coaxial with the first port, the injection subassembly comprising:
  - a nicked alignment tube having a nick near one end;
  - a spray needle fused within the nicked end of the nicked alignment tube, wherein an entry end of the spray needle is positioned alongside the nick and an exit end of the spray needle extends out of the nicked end, wherein the spray needle is one of a sheath flow spray needle and a sheathless spray needle; and a conducting liquid tube, the nicked alignment tube and the spray needle inserted into the conducting liquid tube, wherein the nicked alignment tube aligns the spray needle coaxially within the conducting liquid tube, wherein the nick and the entry end of the spray needle are positioned within the conducting liquid tube and the exit end of the spray needle extends out of the conducting liquid tube, wherein the nicked alignment tube and the conducting liquid tube fit is fluid-tight, wherein the nick allows a conducting liquid to flow from the conducting liquid tube to within the nicked alignment tube and the spray needle, and wherein the conducting liquid tube and the third port fit is fluid-tight;

inserting a capillary through the first port and the third port of the junction fitting into the injection subassembly, wherein the nicked alignment tube aligns the capillary coaxially within the conducting liquid tube, wherein the capillary and the nicked alignment tube fit is fluid-tight, wherein the capillary is one of a sheath flow capillary and a sheathless capillary; inserting a conducting liquid channel into the second port of the junction fitting, wherein the conducting liquid channel is configured to convey conducting liquid from a conducting liquid reservoir, and the conducting liquid channel and the second port fit is fluid-tight;

filling the conducting liquid reservoir with the conducting liquid;

introducing an analyte species into the capillary;

applying an electric field from a high voltage source to the conducting liquid in the conducting liquid reservoir to generate nanospray at the exit end of the spray needle.

18. The method of claim 17, further comprising:

inserting a free end of the capillary extending from the first port of the junction fitting through an optical manifold, the optical manifold comprising:

at least one light source;

at least one input-output optical port; and at least one light detector;

applying light from the at least one light source to the capillary within the optical manifold; and detecting output light that is at least one of transmitted light, refracted light, scattered light, and emitted light at the at least one light detector.

19. The method of claim 18, wherein at least one gradient-index (GRIN) rod is used to perform at least one of:

applying light from the at least one light source to the capillary within the optical manifold; and transmitting the output light to the at least one light detector.

20. The method of claim 18, wherein the at least one light source emits light having a wavelength on the electromagnetic spectrum suitable for use in at least one of ultraviolet detection, infrared detection, laser-induced fluorescence (LIF) detection, thermo-optical detection, scattering, and Raman detection.

* * * * *